UNITED STATES PATENT OFFICE.

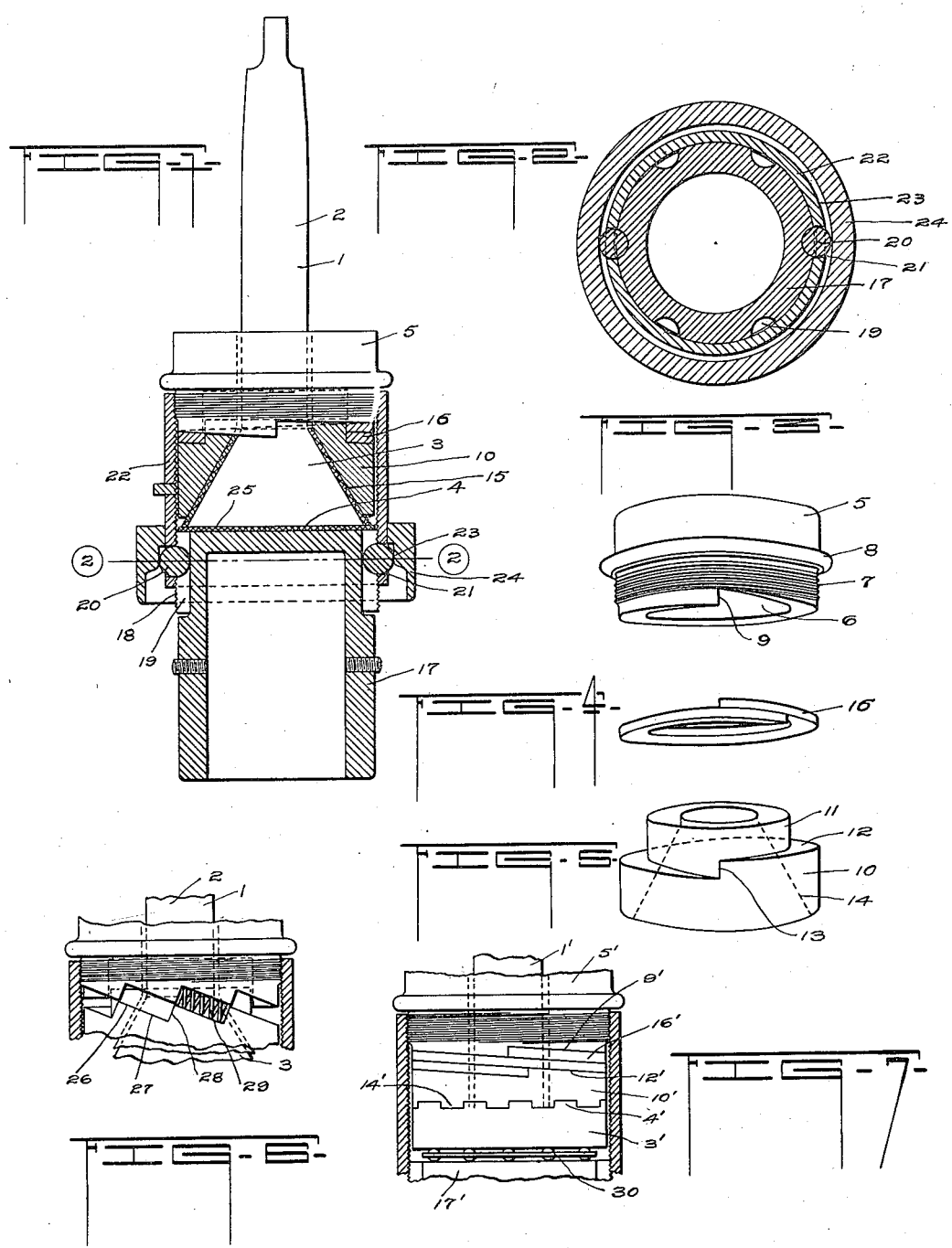

ARTHUR W. BURKS, OF DECATUR, ILLINOIS, ASSIGNOR TO DECATUR PUMP AND MANUFACTURING COMPANY, OF DECATUR, ILLINOIS, A CORPORATION OF ILLINOIS.

CLUTCH.

1,281,507.  Specification of Letters Patent.  Patented Oct. 15, 1918.

Application filed October 31, 1916. Serial No. 128,686.

*To all whom it may concern:*

Be it known that I, ARTHUR W. BURKS, a resident of Decatur, county of Macon, and State of Illinois, have invented certain new and useful Improvements in Clutches, of which the following is a specification.

My invention relates to improvements in clutches and the principal object is the provision of a torque transmitting device or clutch which will transmit a predetermined load only.

Another object of this invention is the provision of such a mechanism utilizing the principle of an inclined plane in its operation.

A further object is the provision of a pair of relatively movable members, one forming part of a clutch and coöperating with a driving member to transmit power, an inclined plane arrangement being provided between said relatively movable members so that when the load exceeds a point predetermined by adjustment the clutch is permitted to disengage.

Another object of this invention is the provision of such a mechanism including in combination a clutch member connected to the driving member, a pair of members relatively movable on said driving member and one forming the other member of the clutch, the other of said pair of members having connection with the driven member, said pair of members having inclined plane portions and resilient means interposed between said inclined plane portions so that when the load is too heavy the clutch is permitted to disengage.

To the accomplishment of the foregoing and such other objects as may hereinafter appear, my invention consists in the construction, combination and arrangement of parts hereinafter described and then sought to be defined in the appended claims, reference being had to the accompanying drawings forming a part hereof and which shows for the purpose of illustrating disclosure several embodiments of my invention, it being expressly understood that these are illustrative only and that various changes may be made in practice within the scope of the claims without digressing from my inventive idea.

In the drawings,

Figure 1, represents a longitudinal sectional view through a tool or chuck driving mechanism constructed so as to embody one form of my invention.

Fig. 2 is a cross-section on line 2—2 of Fig. 1.

Fig. 3 is a perspective view of the first sleeve member.

Fig. 4 is a perspective view of the torsion spring member.

Fig. 5 is a perspective view of the second sleeve member which forms one part of the clutch.

Fig. 6 is a detail view in elevation of a slightly modified construction embodying my invention.

Fig. 7 is an elevation in detail of another modified construction embodying my invention.

While I have shown this invention as applied particularly to tool chucks and the like, it is to be expressly understood that it is applicable to and may be utilized in connection with, the transmission of power for various other purposes, such as automobile clutches for example. As a matter of fact the principle is capable of general application in the transmission of power.

Referring now to the drawing and particularly to Figs. 1 to 5 inclusive the numeral 1 designates the driving member which is adapted to be connected to a suitable source of power. This member 1 is in the form of a reduced portion forming a rod or shaft 2 having the conical friction member 3 on the end thereof with the flat face 4. Loosely mounted on the reduced portion of driving member 1, that is, on the rod or shaft 2, is the sleeve 5 having the recess 6 and the screw threaded annular flange 7 in its front portion, a bead 8 being formed on the outside thereof. The inner edge or face of this flange 7 is formed on an inclined plane beginning with and terminating at the shoulder 9, the outside peripheral surface of the inclined plane portion being smooth.

A second sleeve 10 is also loosely mounted on the rod or shaft portion 2, having the reduced hub portion 11 fitting within the recess 6 in the first sleeve 5. The shoulder 12 formed by this reducing is also in the form of an inclined plane beginning and terminating with the shoulder or abutment 13. The outer peripheral surface of this second sleeve is smooth, the diameter being substantially the same as that of the smooth portion of sleeve 5. The sleeve 10 is formed with the tapered or conical bore 14 corresponding to the conical member 3 of the driving member and the correspondingly shaped friction member or washer 15 is positioned between these tapered parts.

Positioned between the two sleeves 5 and 10 and resting on the inclined plane faces is the coil torsion spring member 16, the end portions of which overlap as shown. The ends thereof engage the shoulders or abutments 9 and 13, the spring therefore connecting the two sleeves for positive movement.

The driven member is designated by the reference character 17 and has its end portion 18 screw threaded and of the same diameter as the threaded portion of sleeve 5. This threaded portion 18 is provided with the grooves or recesses 19 to receive antifriction balls 20 which are positioned in apertures 21 in the assembling and adjusting sleeve 22, these balls being positioned in the groove 23 in the locking ring 24 on the outside of assembling and adjusting sleeve 22. This assembling and adjusting sleeve 22 is internally screw threaded to correspond to the screw threaded portions of the driven member and the first mentioned sleeve 5, so as to hold the parts in the position shown in Fig. 1, and by means of which the necessary adjustment may be made. The flat friction disk or washer 25 may be used between the flat face 4 of the driving member and the end face of the driven member.

It is seen that when power is applied to the driving member it is transmitted to the conical friction member 3, conical washer 15, second mentioned sleeve 10, through spring 16 the ends of which engage the shoulders or abutments 9 and 13, to the first mentioned sleeve 5, and thence by means of the assembling and adjusting sleeve 22 to the driven member 17. When the work is too heavy, the torsion spring 16 is overcome, uncoiling slightly and allowing the two sleeves 5 and 10 to move toward each other and lessening the frictional engagement between the conical member and its washer and socket so that the parts slip.

In Fig. 6, I show a slightly modified form, the only difference being in the form of the inclined plane feature of the construction. Instead of having only one inclined plane on each sleeve, I provide a plurality of shorter inclined planes 26, the number of which may be varied as desired, these being formed by notching or cutting out the face portions and having the inclines 27 leading up to an abrupt shoulder or abutment 28. These parts are arranged in opposition so that sockets or recesses are formed between opposed shoulders or abutments 28 on each sleeve and in each socket or recess is positioned a coil compression spring 29, it being understood that a plurality of the springs are provided one for each clutch or recess. These springs act as the connecting members between the sleeves to transmit power, but are yielding, so as to give when the work is too heavy to permit the sleeves to move toward each other and allow the frictionally engaging parts to slip. The construction is substantially the same as that previously described but is capable of finer or nicer adjustment. The number of springs 29 may be varied as desired to afford different resistances.

This same idea is just as readily applicable to positive clutches, in contradistinction to friction clutches and I show an embodiment of my invention applied to one form of positive clutch in Fig. 7. The parts are all substantially the same as shown in Figs. 1 to 5 inclusive, except the clutching members. In this figure, 5' designates the first sleeve having the inclined face 9', and 10' the second sleeve having the inclined plane face 12', with the torsion spring 16', located therebetween and its ends engaging the shoulders or abutments of said inclined planes. The driving member 1' is provided with the clutch member 3', having the clutch teeth 4' adapted to engage the corresponding clutch teeth 14', formed in the second sleeve 10'. A suitable end ball bearing 30 is provided between the driven member 17' and the clutch member 3'. The torsion spring 16' is formed with a sufficient number of coils so as to permit disengagement of the clutching faces when the load is too heavy or causes the spring to uncoil, the action of the inclined plane arrangement being the same as in the other forms.

While I have shown the assembling and adjusting sleeve separate from the first mentioned sleeve, it is obvious that it may be permanently secured thereto or form an integral part thereof, the adjustment being provided at the other end thereof.

This principle, that is the inclined plane, forms a simple and effective method of providing an adjustable clutch, for transmitting power and in which the maximum load may be fixed.

What I claim is:—

1. A mechanism of the character described, including in combination, a driving member, a driven member and a connection between said driving and said driven members, said connection including clutching elements and elements having inclined plane surfaces with terminal shoulders and a connecting element between said inclined plane surfaces with its ends engaging said terminal shoulders.

2. A mechanism of the character described, including in combination, a driving member, a driven member and a connection between said driving and said driven members, said connection including clutching elements and elements having inclined plane surfaces with terminal shoulders and a resilient connecting element interposed between said inclined surfaces with its ends engaging said terminal shoulders.

3. A mechanism of the character described, including in combination, a driving member, a driven member, a sleeve loosely mounted on said driving member and connected to said driven member, a second sleeve member having a normal clutching connection with said driving member, said sleeve members each having an inclined plane element and a connection between said inclined plane elements normally holding the clutching connection in engagement but permitting it to yield when the load exceeds a predetermined maximum.

4. A mechanism of the character described, including in combination, a driving member, a driven member, a sleeve loosely mounted on said driving member and connected to said driven member, a second sleeve member having a normal clutching connection with said driving member, said sleeve members each having an inclined plane element and a resilient connection between said inclined plane elements normally holding the clutching connection in engagement but permitting it to yield when the load exceeds a predetermined maximum.

5. A mechanism of the character described, including in combination, a driving member, a driven member, a sleeve loosely mounted on said driving member and connected to said driven member, a second sleeve member having a normal clutching connection with said driving member, said sleeve members each having an end portion formed with an inclined plane construction beginning and terminating with a shoulder or abutment and a resilient connection between said inclined planes with its ends engaging opposed shoulders or abutments so as to permit said clutching connection to yield when the load exceeds a predetermined maximum.

6. A mechanism of the character described, including in combination, a driving member, a driven member, a sleeve loosely mounted on said driving member and connected to said driven member, a second sleeve member having a normal clutching connection with said driving member, said sleeve members each having an end portion formed with an inclined plane construction beginning and terminating with a shoulder or abutment and a coiled torsion spring between said inclined planes with its ends engaging opposed shoulders or abutments so as to permit said clutching connection to yield when the load exceeds a predetermined maximum.

ARTHUR W. BURKS.